US010880044B2

(12) United States Patent
Määttänen et al.

(10) Patent No.: US 10,880,044 B2
(45) Date of Patent: Dec. 29, 2020

(54) PACKET RETRANSMISSION IN A WIRELESS COMMUNICATION SYSTEM

(71) Applicant: Telefonaktiebolaget LM Ericsson (publ), Stockholm (SE)

(72) Inventors: Helka-Liina Määttänen, Helsinki (FI); Torsten Dudda, Aachen (DE); Christofer Lindheimer, Linköping (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 16/094,055

(22) PCT Filed: May 12, 2017

(86) PCT No.: PCT/EP2017/061448
§ 371 (c)(1),
(2) Date: Oct. 16, 2018

(87) PCT Pub. No.: WO2017/194733
PCT Pub. Date: Nov. 16, 2017

(65) Prior Publication Data
US 2019/0280819 A1    Sep. 12, 2019

Related U.S. Application Data

(60) Provisional application No. 62/336,326, filed on May 13, 2016.

(51) Int. Cl.
*H04L 1/08* (2006.01)
*H04L 29/06* (2006.01)
(Continued)

(52) U.S. Cl.
CPC .............. *H04L 1/08* (2013.01); *H04L 1/1671* (2013.01); *H04L 1/188* (2013.01); *H04L 1/1887* (2013.01); *H04L 69/22* (2013.01); *H04W 72/12* (2013.01)

(58) Field of Classification Search
None
See application file for complete search history.

(56) References Cited

U.S. PATENT DOCUMENTS 8,964,688 B2* 2/2015 Kim .................. H04L 1/1896
370/330
2002/0136233 A1* 9/2002 Chen ................ H04W 72/1215
370/445
(Continued)

FOREIGN PATENT DOCUMENTS

WO    2010018990 A2    2/2010
WO    2015127670 A1    9/2015

*Primary Examiner* — Bunjob Jaroenchonwanit
(74) *Attorney, Agent, or Firm* — Coats & Bennett, PLLC

(57) ABSTRACT

A transmitting radio node (12) is configured for transmitting packets in a wireless communication system (10). The transmitting radio node (12) in particular is configured to transmit packets to a receiving radio node (16) as scheduled by the receiving radio node (16) over one or more of multiple different types of radio links (18, 20) between which transmission of the packets is configured to be split or switched. The transmitting radio node (12) is also configured to receive from the receiving radio node (16) a retransmission link indication (40) that indicates over which of the multiple different types of radio links (18, 20) packet retransmission is to be performed. The transmitting radio node (12) is further configured to perform packet retransmission based on the retransmission link indication (40).

16 Claims, 10 Drawing Sheets

(51) Int. Cl.
*H04W 72/12* (2009.01)
*H04L 1/18* (2006.01)
*H04L 1/16* (2006.01)

(56) References Cited

U.S. PATENT DOCUMENTS

| | | | |
|---|---|---|---|
| 2004/0109433 A1* | 6/2004 | Khan | H04L 1/1614 370/345 |
| 2005/0240913 A1* | 10/2005 | Liu | G06Q 10/06 717/144 |
| 2007/0275656 A1* | 11/2007 | Chang | H04L 1/08 455/9 |
| 2007/0293226 A1* | 12/2007 | Lee | H04L 1/1809 455/436 |
| 2009/0046650 A1* | 2/2009 | Dalsgaard | H04L 1/1812 370/329 |
| 2009/0318087 A1* | 12/2009 | Mattila | H04B 1/109 455/63.1 |
| 2010/0062722 A1* | 3/2010 | Dykema | H04B 17/318 455/67.11 |
| 2010/0195584 A1* | 8/2010 | Wilhelmsson | H04L 1/1887 370/329 |
| 2011/0034201 A1* | 2/2011 | Hamada | H04L 67/12 455/517 |
| 2014/0079007 A1 | 3/2014 | Li et al. | |
| 2015/0327275 A1 | 11/2015 | Kwon et al. | |
| 2016/0338066 A1* | 11/2016 | Yang | H04L 1/1874 |
| 2016/0366008 A1 | 12/2016 | Zeng et al. | |
| 2017/0288949 A1* | 10/2017 | Jactat | H04W 36/22 |
| 2017/0331735 A1* | 11/2017 | Jha | H04L 45/74 |
| 2018/0007732 A1* | 1/2018 | Wu | H04W 72/04 |
| 2018/0052722 A1* | 2/2018 | Blackman | G06F 9/546 |
| 2018/0092147 A1* | 3/2018 | Pelletier | H04L 63/205 |
| 2018/0124642 A1* | 5/2018 | Phuyal | H04W 28/08 |
| 2018/0220474 A1* | 8/2018 | Laselva | H04W 28/08 |
| 2018/0376499 A1* | 12/2018 | Fu | H04L 1/1854 |
| 2019/0053120 A1* | 2/2019 | Park | H04W 36/305 |
| 2019/0159056 A1* | 5/2019 | Naftali | H04W 28/0221 |
| 2019/0246421 A1* | 8/2019 | Zhou | H04L 5/0048 |
| 2019/0246441 A1* | 8/2019 | Pelletier | H04L 63/068 |
| 2019/0261231 A1* | 8/2019 | Sivavakeesar | H04W 36/0061 |
| 2019/0327030 A1* | 10/2019 | Yoshimoto | H04W 28/04 |

* cited by examiner

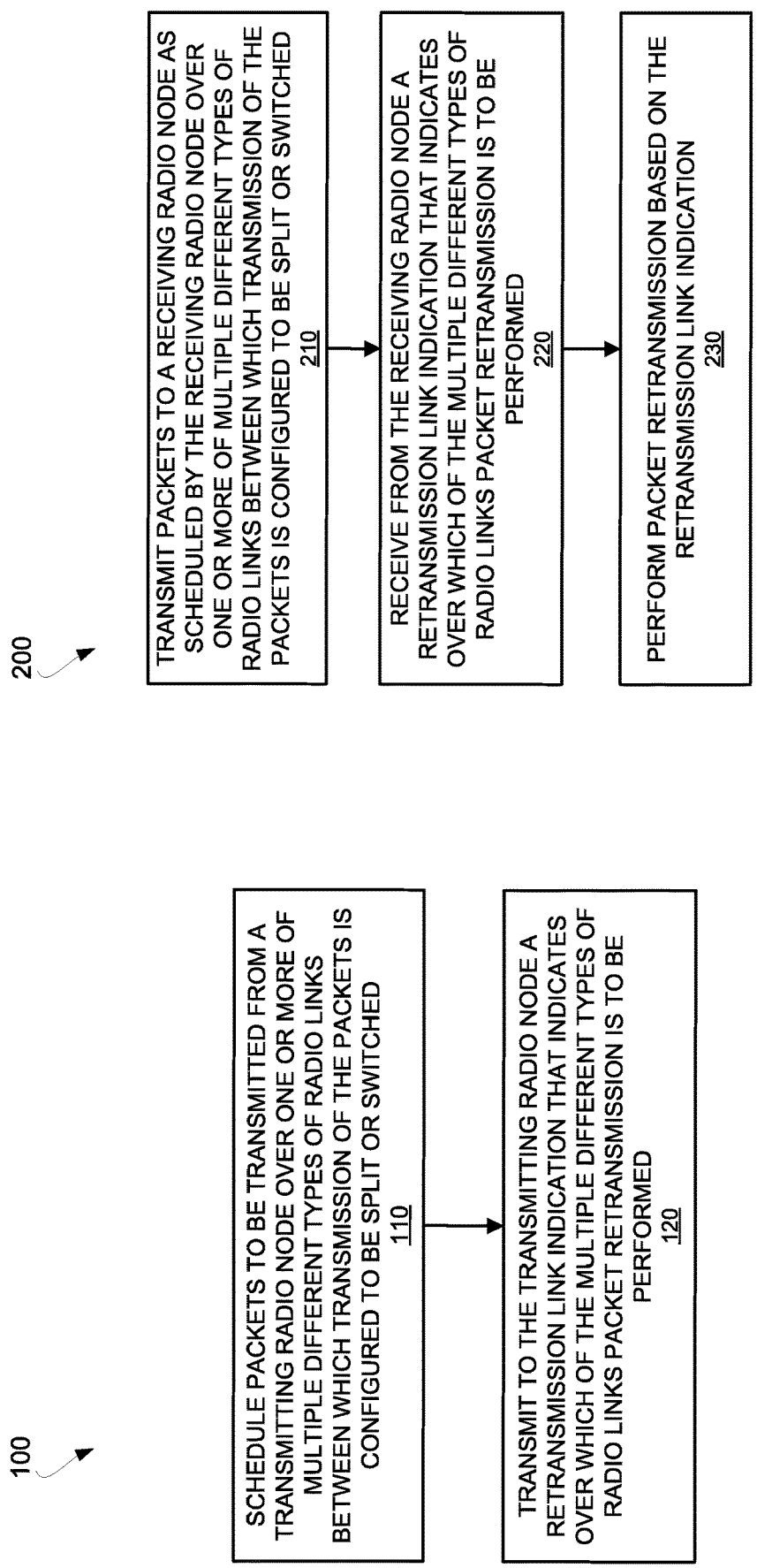

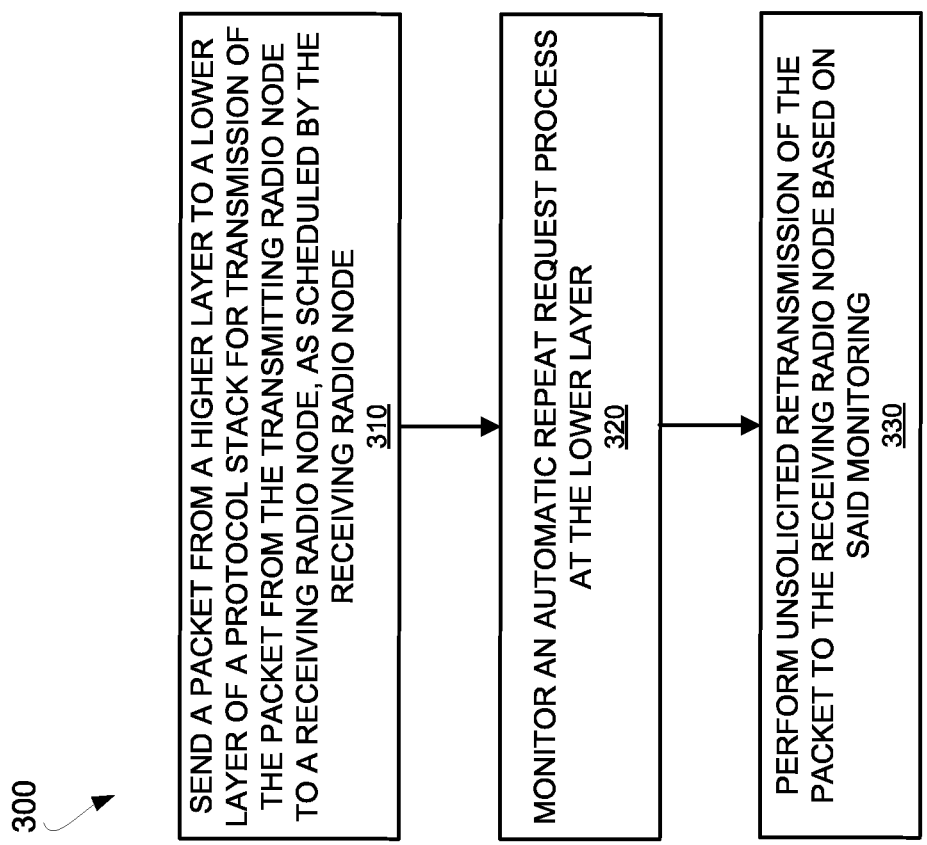

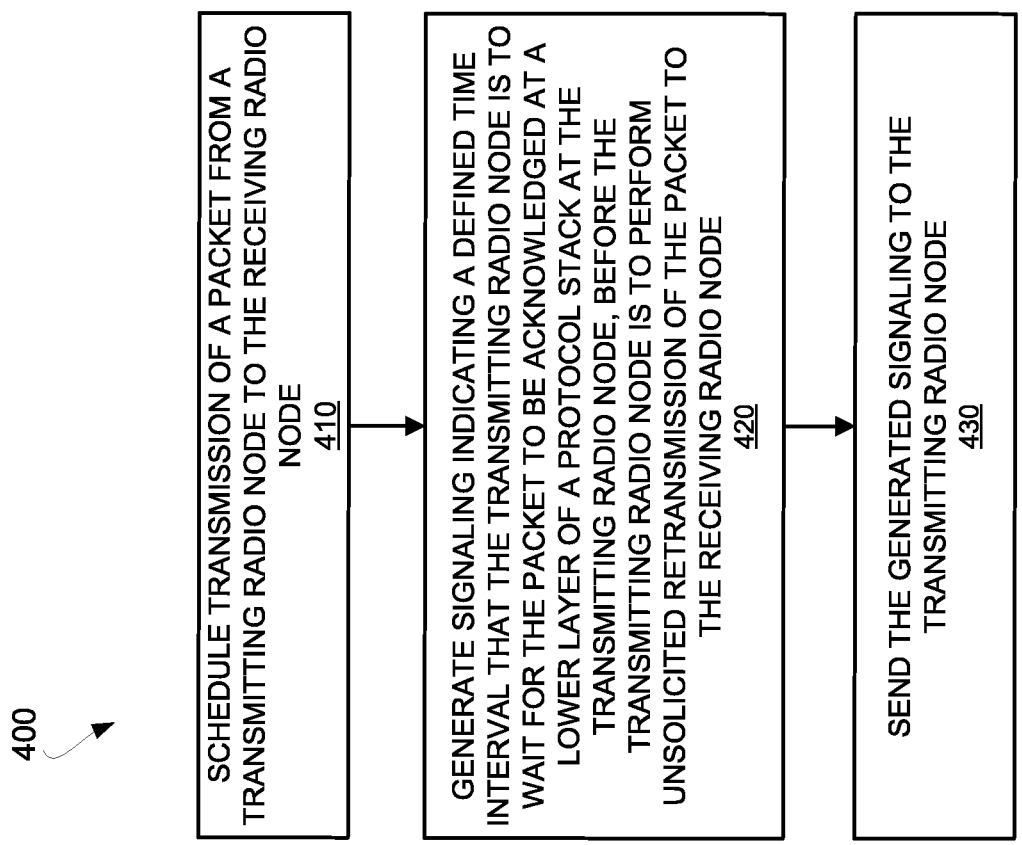

US 10,880,044 B2

PACKET RETRANSMISSION IN A WIRELESS COMMUNICATION SYSTEM

RELATED APPLICATIONS

This application claims priority to U.S. Provisional Patent Application Ser. No. 62/336,326 filed May 13, 2016, the entire contents of which are incorporated herein by reference.

BACKGROUND

LTE-WLAN aggregation (LWA) is a feature wherein a user equipment (UE) may receive and transmit using links to both enhanced NodeB (eNB) and wireless local area network (WLAN). This feature has been standardized by the $3^{rd}$ Generation Partnership Project (3GPP) in Release 13 (Rel-13). In the downlink split bearer architecture option, the eNB may dynamically decide how to route packet data convergence protocol (PDCP) packet data units (PDUs) to the UE—either to the UE directly using Long Term Evolution (LTE) Radio Link Control (RLC), LTE Medium Access Control (MAC), and LTE Physical Layer (PHY), or via a backhaul channel to WLAN and then to the UE using 802.11 MAC and 802.11 PHY.

In the standardized Rel-13 LWA, uplink data transmissions are done via LTE only. In this LWA context and others, complexities arise in transmitting and retransmitting packets (e.g., PDCP PDUs) when those packets may be transmitted and retransmitted over different types of radio links (e.g., LTE and WLAN). These complexities exist especially in situations (e.g., as in LWA uplink) where scheduling decisions are made at the node which receives those packets rather than at the node which transmits the packets.

SUMMARY

According to one or more embodiments herein, a receiving radio node that schedules its receipt of a packet on one or more of multiple different types of radio links also controls the type of radio link over which that packet is to be retransmitted.

More particularly, embodiments herein include a method implemented by a transmitting radio node for transmitting packets (e.g., packet data convergence protocol, PDCP, packets) in a wireless communication system. The method comprises transmitting packets to a receiving radio node as scheduled by the receiving radio node over one or more of multiple different types of radio links between which transmission of the packets is configured to be split or switched. The method also comprises receiving from the receiving radio node a retransmission link indication that indicates over which of the multiple different types of radio links packet retransmission is to be performed. The method further comprises performing packet retransmission based on the retransmission link indication.

Embodiments further include a method implemented by a receiving radio node for receiving packets (e.g., packet data convergence protocol, PDCP, packets) in a wireless communication system. The method comprises scheduling packets to be transmitted from a transmitting radio node over one or more of multiple different types of radio links between which transmission of the packets is configured to be split or switched. The method also comprises transmitting to the transmitting radio node a retransmission link indication that indicates over which of the multiple different types of radio links packet retransmission is to be performed.

Embodiments also include a method implemented by a transmitting radio node for transmitting a packet (e.g., a packet data convergence protocol, PDCP, packet) in a wireless communication system. The method comprises sending a packet from a higher layer to a lower layer of a protocol stack for transmission of the packet from the transmitting radio node to a receiving radio node, as scheduled by the receiving radio node. The method also comprises monitoring an automatic repeat request process at the lower layer, and performing unsolicited retransmission of the packet to the receiving radio node based on said monitoring.

Embodiments further include a method implemented by a receiving radio node for receiving a packet (e.g., a packet data convergence protocol, PDCP, packet) in a wireless communication system. The method comprises scheduling transmission of a packet from a transmitting radio node to the receiving radio node. The method also comprises generating signaling indicating a defined time interval that the transmitting radio node is to wait for the packet to be acknowledged at a lower layer of a protocol stack at the transmitting radio node, before the transmitting radio node is to perform unsolicited retransmission of the packet to the receiving radio node. The method further comprises sending the generated signaling to the transmitting radio node.

Embodiments further include corresponding apparatus, computer programs, and computer program products.

BRIEF DESCRIPTION OF THE DRAWINGS

FIG. 6 is a logic flow diagram of a method performed by a receiving radio node according to some embodiments.

FIG. 7 is a logic flow diagram of a method performed by a transmitting radio node according to some embodiments.

FIG. 8 is a logic flow diagram of a method performed by a transmitting radio node according to some embodiments.

FIG. 9 is a logic flow diagram of a method performed by a receiving radio node according to other embodiments.

DETAILED DESCRIPTION

Figure 1:
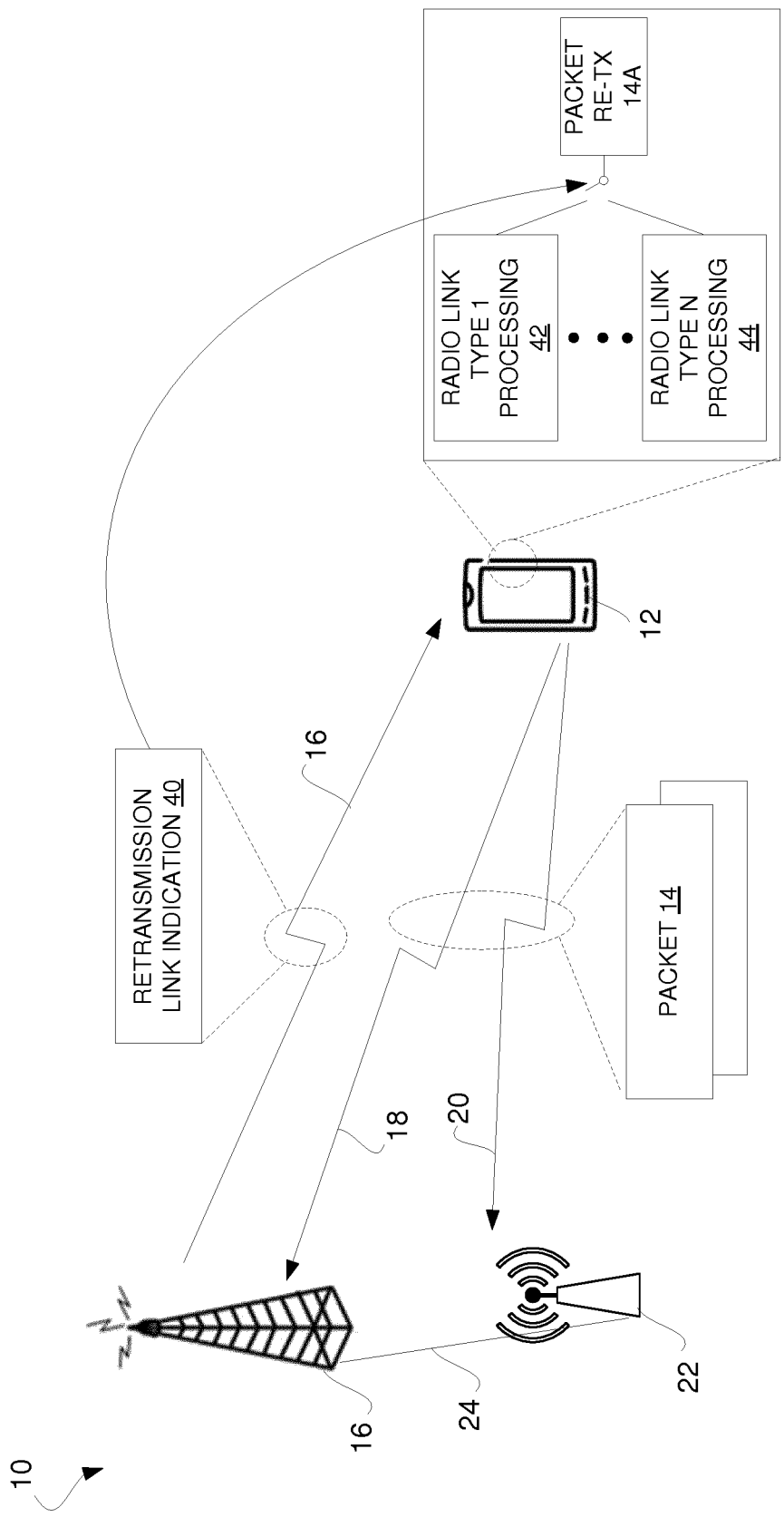
FIG. 1 is a block diagram of a wireless communication system that includes a transmitting radio node and a receiving radio node according to some embodiments.

FIG. 1 illustrates a wireless communication system 10 according to some embodiments. The system 10 includes a transmitting radio node 12 that is configured to transmit packets 14 to a receiving radio node 16. FIG. 1 for example shows the transmitting radio node 12 as a wireless communication device (e.g., a user equipment) and the receiving radio node 16 as a base station (e.g., an eNodeB), such that the packets 14 are transmitted in an uplink direction of the system 10. Embodiments herein however are applicable also to downlink and/or sidelink communication.

Regardless, the receiving radio node 16 schedules the transmitting radio node's transmission of the packets 14 to the receiving radio node 16. The receiving radio node 16 may for instance schedule the packets 14 to be transmitted by the transmitting radio node 12 on certain radio resources, e.g., in time, frequency, code, space, or the like. The receiving radio node 16 may then send the transmitting radio node 12 a scheduling grant indicating the receiving radio node's scheduling decision.

In any event, the receiving radio node 16 notably may schedule the packets 14 to be transmitted over one or more of multiple different types of radio links 18, 20 between which transmission of the packets 14 is configured to be split or switched. As shown, for instance, packets 14 may be transmitted over one type of radio link 18 (e.g., a wireless wide area network, WWAN, link) to the receiving radio node 16 directly. Packets 14 may alternatively be switched to being transmitted over, or may additionally be split to being simultaneously transmitted over, a different type of radio link 20 (e.g., a wireless local area network, WLAN, link) to an intermediate receiving radio node 22, which in turn transmits the packets 14 to the receiving radio node 16 over a backhaul link 24. In other (e.g., co-located) embodiments, though, the different types of radio links 18, 20 are terminated at the receiving radio node 16 itself.

In one or more embodiments, transmission of the packets 14 is configured to be split or switched at a radio access network level. Correspondingly, reception of the packets 14 is configured to be aggregated or switched at the radio access network level. The receiving radio node 16 may for instance receive packets 14 whose transmission is split over the different radio links 18, 20 and then aggregate those packets 14, e.g., for sending on a single radio bearer towards a core network of the system 10. In this and other embodiments, therefore, the packets 14 may be packet data units (PDUs) formed from service data units (SDUs) received at the transmitting radio node 12 over a single radio bearer, such that the single radio bearer is configured to be a split or switched bearer.

Figure 2:
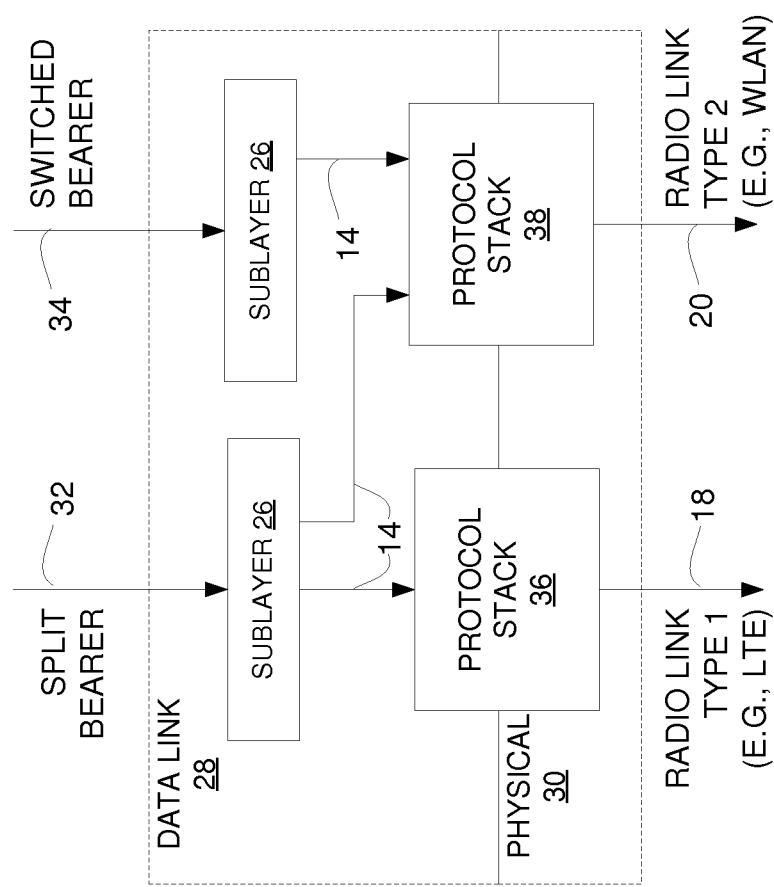
FIG. 2 is a block diagram of protocol stacks associated with different types of radio links according to some embodiments.

FIG. 2 illustrates one example where the packets 14 are formed by a sublayer 26 of a data link layer 28 at the transmitting radio node 12. In this case, the packets 14 as shown in FIG. 2 are split or switched at this sublayer 26. Indeed, as shown, SDUs may be received on a single split bearer 32. Packets 14 in the form of PDUs formed from those SDUs are split onto different protocol stacks 36, 38 associated with the different types of radio links 18, 20. FIG. 2 also shows that SDUs may be received on a single switched bearer 34. Packets 14 in the form of PDUs formed from those SDUs may be switched onto the protocol stack 38 associated with a particular type of radio link 20. This bearer 34 however is switchable such that its SDUs may be switched onto the protocol stack 36 associated with another type of radio link 18.

In some embodiments, the packets 14 are packet data convergence protocol (PDCP) packets. In this case, transmission of these PDCP packets is configured to be split or switched at a PDCP layer between the multiple different types of radio links 18, 20. With reference to FIG. 2, then, the sublayer 26 may be the PDCP layer.

Figure 3:
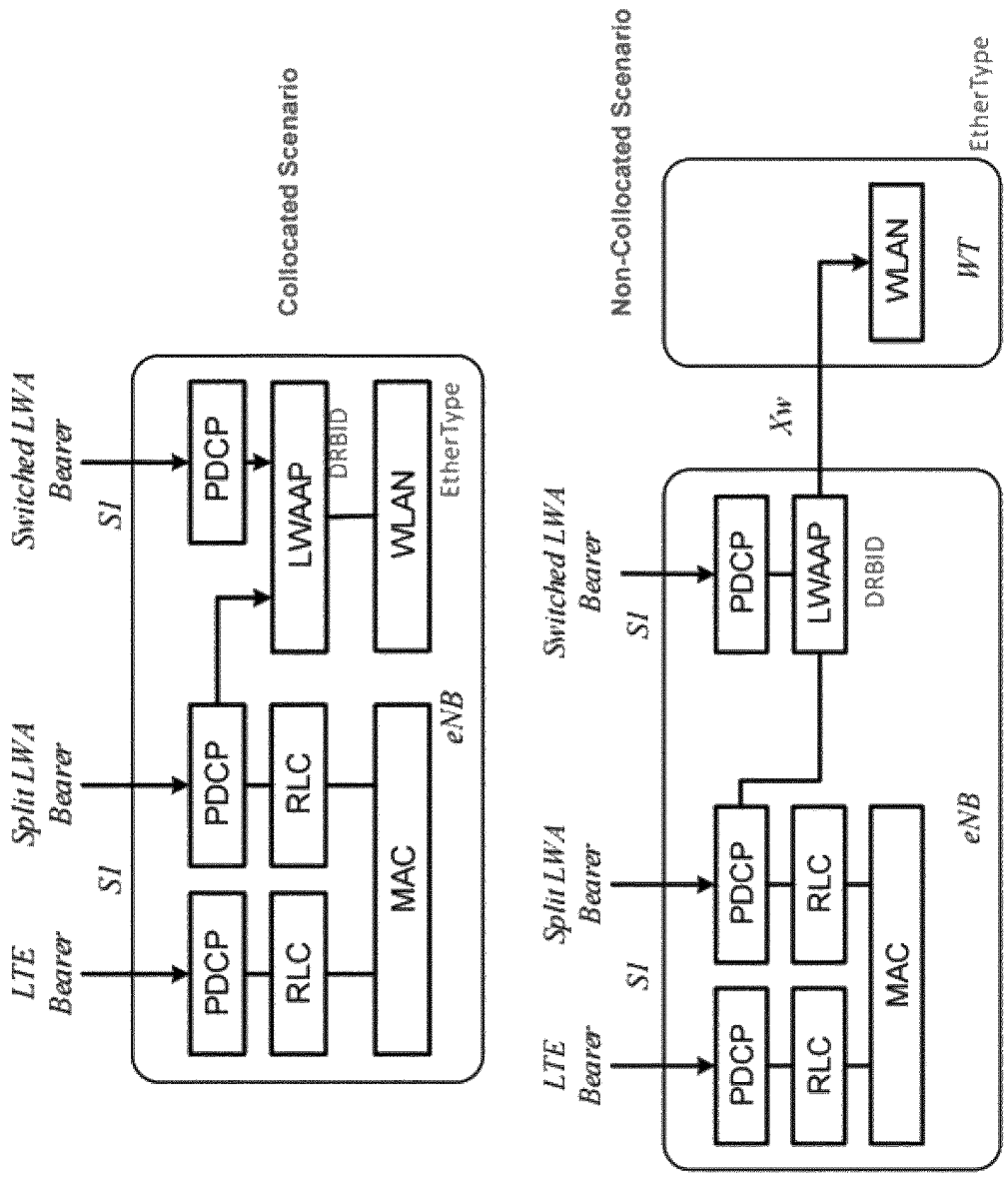
FIG. 3 is a block diagram of the LWA radio protocol architecture of an eNB according to some embodiments.
Figure 4:
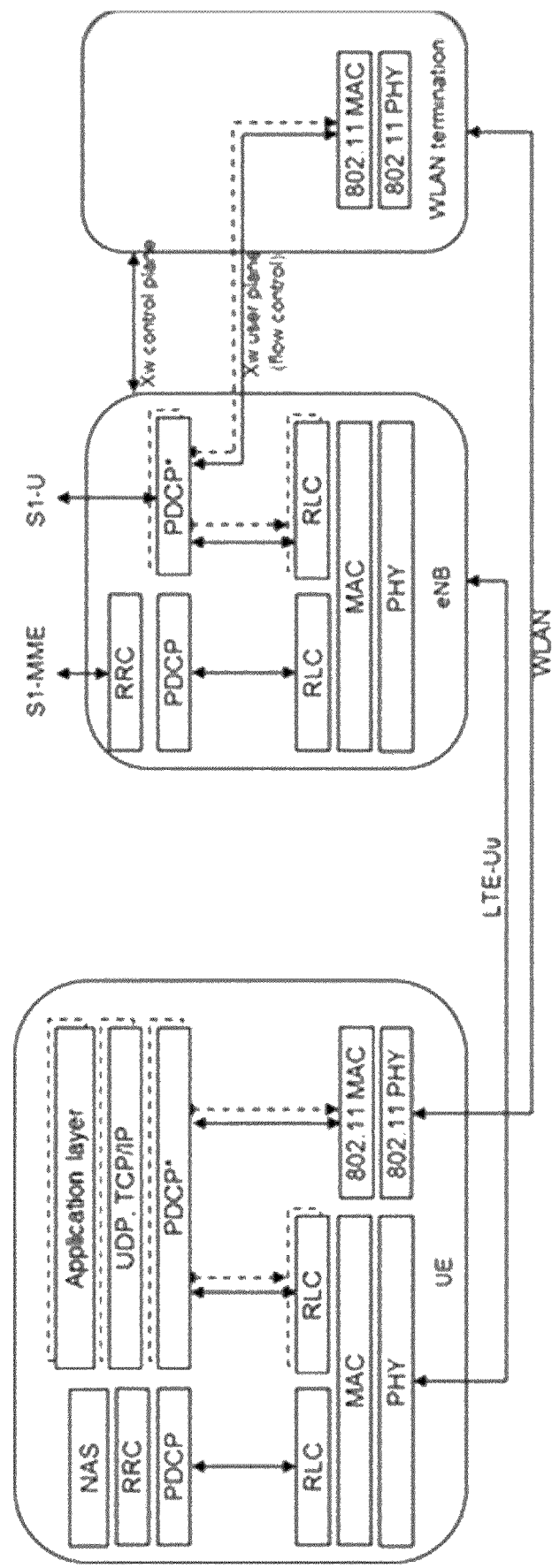
FIG. 4 is a block diagram of the LWA radio protocol architecture from the perspective of both eNB and UE according to some embodiments.

FIGS. 3 and 4 illustrate embodiments where the packets are PDCP packets and the types of radio links 18, 20 are LTE and WLAN links. FIG. 3 illustrates the protocol stacks from the perspective of the eNB. FIG. 4 shows the envisaged protocol architecture for LTE-WLAN aggregation from the perspective of both the UE and eNB. The WLAN termination (WT) point in the network may be implemented by an WLAN access point (AP) and/or access controller (AC) or a further network node. The interface protocol between eNB and WT is denoted Xw.

Accordingly, the radio links 18, 20 may be different types in the sense that the radio links 18, 20 use different radio access technologies (RATs). For example, radio link 18 may use LTE whereas radio link 20 may use WLAN (e.g., WiFi). Alternatively or additionally, the radio links 18, 20 may be different types in the sense that the radio links 18, 20 are deployed in different types of spectrum (e.g., licensed vs. unlicensed). Alternatively or additionally, the radio links 18, 20 may be different types in the sense that the radio links 18, 20 have different radio protocol stacks or otherwise employ different radio link processing. In the same or different embodiments, the different types of radio links 18, 20 may use different error control protocols for handling erroneous transmission of a packet 14. For example, one type of radio link 18 may substantially guarantee error-free delivery of packets 14 from the perspective of sublayer 26, absent certain circumstances (e.g., handover) requiring reestablishment of the error control protocol. The other type of radio link 20 may by contrast not provide that guarantee under any circumstances, e.g., failure to deliver a packet 14 after a certain amount of time or certain number of attempts results in packet loss.

Regardless of the particular types of the radio links 18, 20, though, one or more embodiments herein account for the different nature of the radio links 18, 20 by having the receiving radio node 16 not only schedule packet transmission over the links 18, 20 but also control over which of the radio links 18, 20 packet retransmission is to be performed. As shown in FIG. 1 in this regard, the receiving radio node 16 transmits a retransmission link indication 40 to the transmitting radio node 12. This indication 40 indicates over which of the multiple different types of radio links 18, 20 packet retransmission is to be performed. The transmitting radio node 12 correspondingly performs packet retransmission based on that indication 40. FIG. 1 for instance shows that retransmission of a packet 14A may be performed over a particular one of the radio links 18, 20 based on the retransmission link indication 40. In this way, the retransmitted packet 14A may be subjected to particular radio link processing 42 or 44 (e.g., error control processing) for a particular link 18 or 20, as controlled by the receiving radio node 16 (e.g., based on link quality, load balancing, or the like). The receiving radio node 16 in some embodiments thereby decides on which link 18 or 20 packet retransmission is to occur based on one or more criteria, e.g., as part of balancing (re)transmission efficiency and link load.

Accordingly, in some embodiments, the retransmission link indication 40 indicates that packet retransmission is to be performed over a different radio link than the radio link over which original packet transmission is configured to be performed. That is, the retransmission link indication 40 effectively switches the radio link over which retransmission is performed. The retransmission link indication 40 may for example effectively switch packet retransmission from WLAN to LTE in order to exploit RLC ARQ for realizing lossless PDCP PDU transmission, e.g., unless LTE link quality is below a threshold and/or LTE load is above a threshold.

No matter the particular criteria on which the retransmission link decision is made by the receiving radio node 16, that decision may be made specifically for packet transmissions that are retransmissions (separate and apart from any decision made specifically for packet transmissions that are original transmissions). Alternatively, the decision may be made more generally for any transmissions irrespective of whether they are original packet transmissions or packet retransmissions. Accordingly, in some embodiments, the retransmission link indication may in a sense be a transmission link indication that indicates generally over which of the multiple different types of radio links 18, 20 packet transmission and retransmission is to be performed. The transmitting radio node 12 in this case may base its determination of over which radio link 18, 20 to perform packet transmission on the transmission link indication, irrespective of whether that packet transmission is an original transmission or a retransmission.

The retransmission link indication 40 may be conveyed in any number of ways. In some embodiments, for example, the retransmission link indication 40 is signaled to the transmitting radio node 12 in a semi-static manner such as via radio resource control (RRC) configuration. In these and other embodiments, therefore, the retransmission link indication 40 may be included in an RRC message, such as an RRC connection reconfiguration message and/or an RRC command. Alternatively or additionally, the retransmission link indication 40 may be signaled to the transmitting radio node 12 in a more dynamic manner. The retransmission link indication 40 may be included for instance in a PDCP control PDU, e.g., an extended version of a PDCP status report, PDCP LWA status report, or a variant of these. Regardless, in some embodiments, a dynamically signaled retransmission link indication 40 (e.g., via a PDCP control PDU) may override or have priority over any retransmission link indication 40 semi-statically signaled (e.g., via RRC). In fact, in some embodiments, a dynamically signaled retransmission link indication 40 may indicate that a radio link other than the one that is semi-statically configured for original packet transmission is to be used for packet retransmission.

In one or more embodiments, for example, the retransmission link indication 40 comprises a flag in a control message, e.g., in a PDCP control PDU. Setting the flag may indicate in some embodiments that the not-RRC-configured radio link is to be used for packet retransmission, i.e., not the radio link used for original packet transmission (also referred to as continuous packet transmission/operation). Alternatively, the flag being set may indicate in other embodiments that packet retransmission is to be performed over a particular one of the radio links (e.g., an LTE link), and the flag not being set may indicate that packet retransmission is to be performed over a different one of the radio links (e.g., a WLAN link). In still other embodiments, instead of the flag indicating the radio link that is to be used for retransmissions specifically, setting the flag may indicate the radio link to be used for both original transmissions and retransmissions is to be changed to another radio link, i.e., the radio link (or radio link direction) to be used is toggled.

No matter the particular way in which the retransmission link indication 40 is conveyed, the retransmission link indication 40 in some embodiments is retransmission-agnostic in the sense that it controls the link 18, 20 over which any retransmission is made. That is, the indication 40 governs the link 18, 20 over which a retransmission is made no matter the packet being retransmitted and/or no matter which of potentially multiple retransmission attempts is being performed for a given packet. In other embodiments, by contrast, the retransmission link indication 40 is retransmission-specific in the sense that it controls the link 18, 20 over which a particular retransmission is made. In this case, the indication 40 may govern the link 18, 20 over which a retransmission is made for a specific packet and/or for a specific one of potentially multiple retransmission attempts performed for a given packet.

In these latter and other embodiments, the receiving radio node 16 may transmit to the transmitting radio node 12 a retransmission packet indication that indicates a particular packet (e.g., a particular PDCP PDU) to retransmit to the receiving radio node 16. In this case, the retransmission link indication 40 may indicate over which of the multiple different types of radio links to retransmit that particular packet. In some embodiments, the retransmission link indication 40 and the retransmission packet indication are included in a request message transmitted from the receiving radio node 16 to the transmitting radio node 12, e.g., requesting retransmission of the particular packet.

In some embodiments where packets are assigned respective sequence numbers (SNs), the retransmission packet indication may be a first missing sequence (FMS) number which specifies the sequence number of the first missing packet (i.e., the earliest SN among missing packets). Alternatively or additionally, the retransmission packet indication may be included in a bitmap or list which specifies SNs of one or more packets to be retransmitted. In yet other embodiments, the retransmission packet indication may be indicated (indirectly) as a number of missing packets (NMPs) and/or a highest received SN (e.g., a highest received SN over WLAN, HRW).

In other embodiments, by contrast, rather than the receiving radio node 16 actually controlling which particular packet to retransmit, the transmitting radio node 12 may autonomously decide which packets to retransmit at least under some circumstances. In this case, then, the transmitting radio node 12 may perform retransmissions on its own in an unsolicited manner, i.e., without request from the receiving radio node 16. This autonomous decision in some embodiments may be overridden by the receiving radio node 16 sending an indication to retransmit a particular packet.

Figure 5:
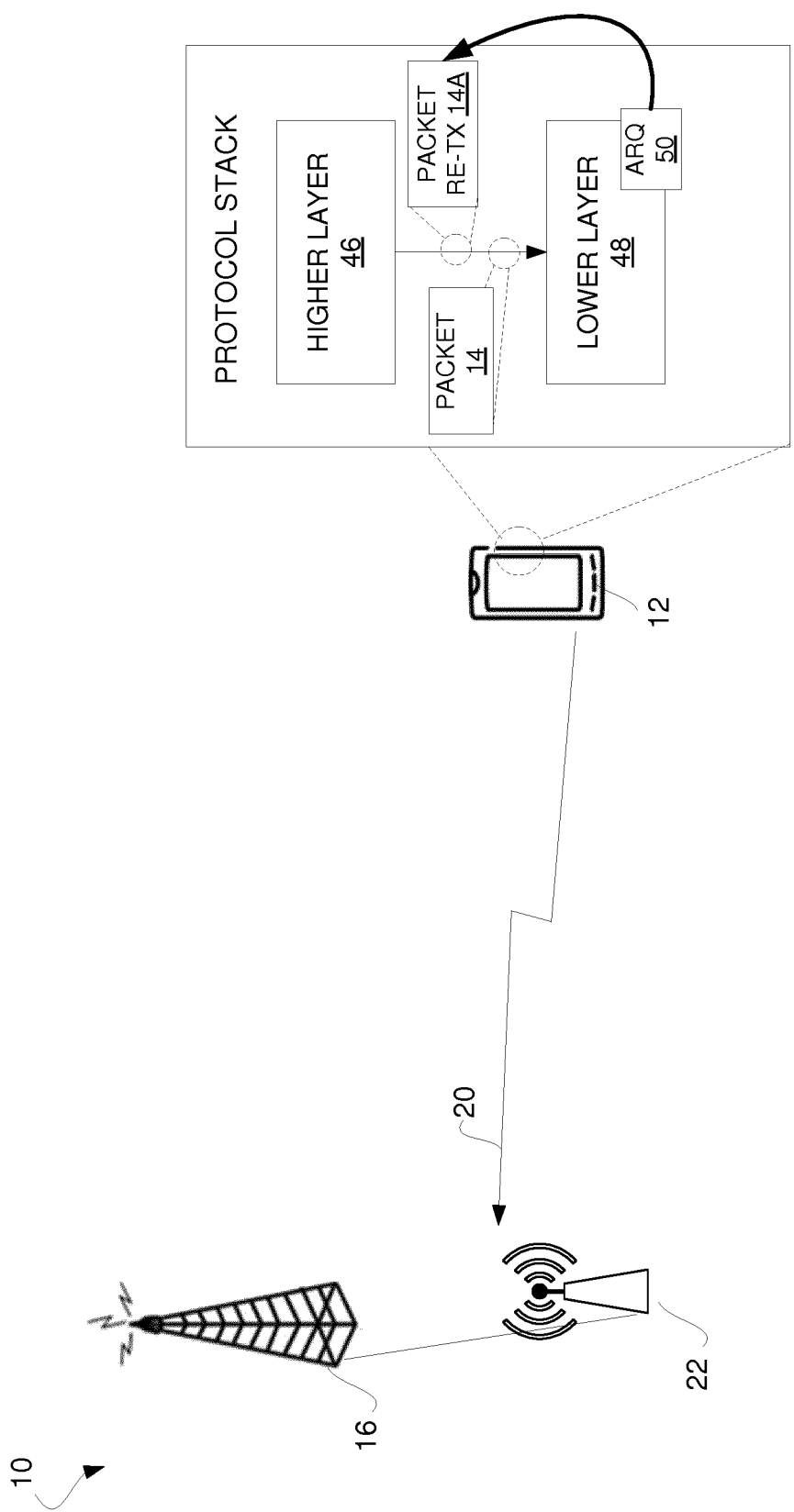
FIG. 5 is a block diagram of a wireless communication system that includes a transmitting radio node and a receiving radio node according to other embodiments.

FIG. 5 illustrates one embodiment for how a transmitting radio node 12 autonomously decides which packets to retransmit. As shown, the transmitting radio node 12 sends a packet 14 (e.g., a PDCP PDU) from a higher layer 46 (e.g., PDCP layer) to a lower layer 48 (e.g., MAC) of a protocol stack for transmission of the packet 14 from the transmitting radio node 12 to the receiving radio node 16, as scheduled by the receiving radio node 16. The transmitting radio node 12 (e.g., using an intermediate layer or sublayer between the higher and lower layers) monitors an automatic repeat request (ARQ) process 50 at the lower layer 48. The transmitting radio node 12 performs unsolicited retransmission of the packet 14 to the receiving radio node 16 based on this monitoring.

As shown in FIG. 5 for instance, the transmitting radio node 12 may retransmit packet 14A if packet 14 is not acknowledged at the lower layer 48, even if the receiving radio node 16 does not request that the packet be retransmitted. In some embodiments, the transmitting radio node 12 does so if the packet 14 is not acknowledged within a defined time interval since sending the packet 14 from the higher layer 46 to the lower layer 48. The receiving radio node 16 may generate and send signaling to the transmitting radio node 12 indicating this defined time interval that the transmitting radio node 12 is to wait for acknowledgement of a packet at the lower layer 48 before performing unsolicited retransmission of the packet. In some embodiments, the receiving radio node 16 determines this defined time interval based on the length of its current reordering buffer (e.g., so as to prevent the transmitting radio node 12 from retransmitting packets that can no longer be reordered at the receiving radio node 16). Regardless, the transmitting radio node 12 may correspondingly configure the defined time interval based on the received signaling.

Note that the embodiment in FIG. 5 may be implemented separately from the embodiment illustrated in FIG. 1, e.g., without regard to splitting or switching of packets between radio links 18, 20. Indeed, FIG. 5 may be implemented with a single radio link 20. In other embodiments, though, FIG. 5 is applicable to a particular radio link of FIG. 1, e.g., link 20.

In view of the above modifications and variations, FIG. 6 illustrates a method 100 performed by a receiving radio node 16 for receiving packets 14 in a wireless communication system 10 according to some embodiments. The method 100 includes scheduling packets 14 to be transmitted from a transmitting radio node 12 over one or more of multiple different types of radio links 18, 20 between which transmission of the packets is configured to be split or switched (Block 110). The method 100 also includes transmitting to the transmitting radio node 12 a retransmission link indication 40 that indicates over which of the multiple different types of radio links packet retransmission is to be performed (Block 120).

FIG. 7 correspondingly illustrates a method 200 performed by a transmitting radio node 12 for transmitting packets in a wireless communication system 10. The method 200 includes transmitting packets 14 to a receiving radio node 16 as scheduled by the receiving radio node 16 over one or more of multiple different types of radio links 18, 20 between which transmission of the packets 14 is configured to be split or switched (Block 210). The method 200 also includes receiving from the receiving radio node 16 a retransmission link indication 40 that indicates over which of the multiple different types of radio links 18, 20 packet retransmission is to be performed (Block 220). The method 200 further includes performing packet retransmission based on the retransmission link indication (Block 230).

FIG. 8 shows a method 300 performed by a transmitting radio node 12 for transmitting a packet 14 in a wireless communication system 10 according to still other embodiments. The method 300 includes sending a packet 14 from a higher layer 46 to a lower layer 48 of a protocol stack for transmission of the packet 14 from the transmitting radio node 12 to a receiving radio node 16, as scheduled by the receiving radio node 16 (Block 310). The method 300 also includes monitoring an automatic repeat request process at the lower layer 48 (Block 320) and performing unsolicited retransmission of the packet 14 to the receiving radio node 16 based on said monitoring (Block 330).

FIG. 9 shows a corresponding method 400 performed by receiving radio node 16 for receiving a packet in a wireless communication system according to some embodiments. The method 400 includes scheduling transmission of a packet 14 from a transmitting radio node 12 to the receiving radio node 16 (Block 410). The method 400 also includes generating signaling indicating a defined time interval that the transmitting radio node 12 is to wait for the packet 14 to be acknowledged at a lower layer 48 of a protocol stack at the transmitting radio node 12, before the transmitting radio node 12 is to perform unsolicited retransmission of the packet 14 to the receiving radio node 16 (Block 420). The method 400 further includes sending the generated signaling to the transmitting radio node 12 (Block 430).

A radio node herein is any type of node (e.g., a base station or wireless communication device) capable of communicating with another node over radio signals. A radio network node is any type of radio node within a wireless communication network, such as a base station. A wireless communication device is any type of radio node capable of communicating with a radio network node over radio signals. A wireless communication device may therefore refer to a machine-to-machine (M2M) device, a machine-type communications (MTC) device, a NB-IoT device, etc. The wireless device may also be a user equipment (UE), however it should be noted that the UE does not necessarily have a "user" in the sense of an individual person owning and/or operating the device. A wireless device may also be referred to as a radio device, a radio communication device, a wireless terminal, or simply a terminal—unless the context indicates otherwise, the use of any of these terms is intended to include device-to-device UEs or devices, machine-type devices or devices capable of machine-to-machine communication, sensors equipped with a wireless device, wireless-enabled table computers, mobile terminals, smart phones, laptop-embedded equipped (LEE), laptop-mounted equipment (LME), USB dongles, wireless customer-premises equipment (CPE), etc. In the discussion herein, the terms machine-to-machine (M2M) device, machine-type communication (MTC) device, wireless sensor, and sensor may also be used. It should be understood that these devices may be UEs, but are generally configured to transmit and/or receive data without direct human interaction.

In an IOT scenario, a wireless communication device as described herein may be, or may be comprised in, a machine or device that performs monitoring or measurements, and transmits the results of such monitoring measurements to another device or a network. Particular examples of such machines are power meters, industrial machinery, or home or personal appliances, e.g. refrigerators, televisions, personal wearables such as watches etc. In other scenarios, a wireless communication device as described herein may be comprised in a vehicle and may perform monitoring and/or reporting of the vehicle's operational status or other functions associated with the vehicle.

Note that a transmitting radio node 12 (e.g., base station or a wireless communication device such as a UE) as described above may perform the method 200 or 300 and any other processing herein by implementing any functional means or units. In one embodiment, for example, the transmitting radio node 12 comprises respective circuits or circuitry configured to perform the steps shown in FIG. 7 or FIG. 8. The circuits or circuitry in this regard may comprise circuits dedicated to performing certain functional processing and/or one or more microprocessors in conjunction with memory. In embodiments that employ memory, which may comprise one or several types of memory such as read-only memory (ROM), random-access memory, cache memory, flash memory devices, optical storage devices, etc., the memory stores program code that, when executed by the one or more processors, carries out the techniques described herein.

Figure 10:
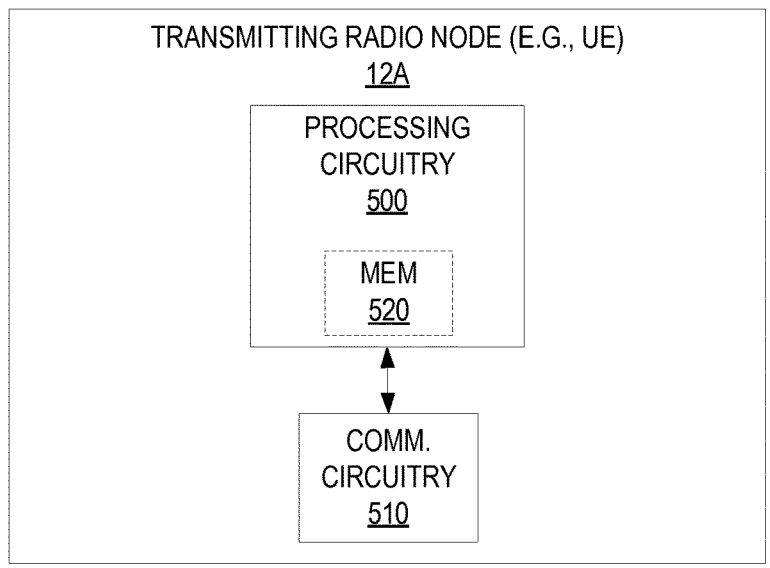
FIG. 10 is a block diagram of a transmitting radio node according to some embodiments.

FIG. 10 illustrates the transmitting radio node 12 in the form of a transmitting radio node 12A in accordance with one or more embodiments. As shown, the transmitting radio node 12A includes processing circuitry 500 and communication circuitry 510. The communication circuitry 510 is configured to transmit and/or receive information to and/or from one or more other nodes, e.g., via any communication technology. Such communication may occur via one or more antennas that are either internal or external to the transmitting radio node 12A. The processing circuitry 500 is configured to perform processing described above, e.g., in FIG. 7 or FIG. 8, such as by executing instructions stored in memory 520. The processing circuitry 500 in this regard may implement certain functional means, units, or modules.

Figure 11:
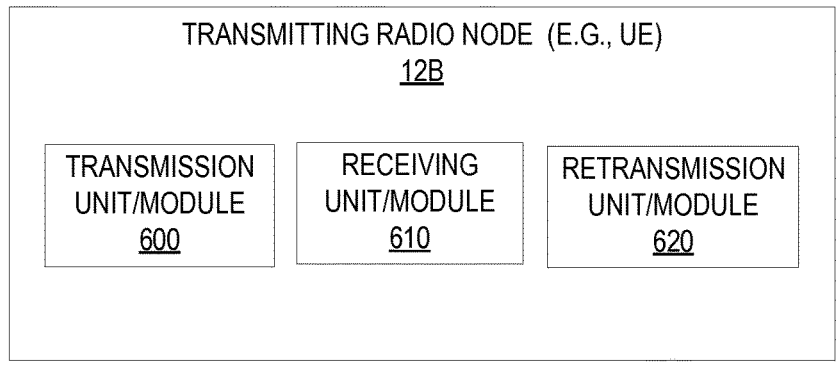
FIG. 11 is a block diagram of a transmitting radio node according to other embodiments.

FIG. 11 illustrates the transmitting radio node 12 in the form of a transmitting radio node 12B implemented in accordance with one or more other embodiments. As shown, the transmitting radio node 12B implements various functional means, units, or modules, e.g., via the processing circuitry 500 in FIG. 10 and/or via software code. These functional means, units, or modules, e.g., for implementing the method in FIG. 7, include for instance a transmission module 600 for transmitting packets to a receiving radio node 16 as scheduled by the receiving radio node 16 over one or more of multiple different types of radio links 18, 20 between which transmission of the packets is configured to be split or switched. Also included is a receiving module 610 for receiving from the receiving radio node 16 a retransmission link indication 40 that indicates over which of the multiple different types of radio links packet retransmission is to be performed. Further included is a retransmission module 620 for performing packet retransmission based on the retransmission link indication 40.

Figure 12:
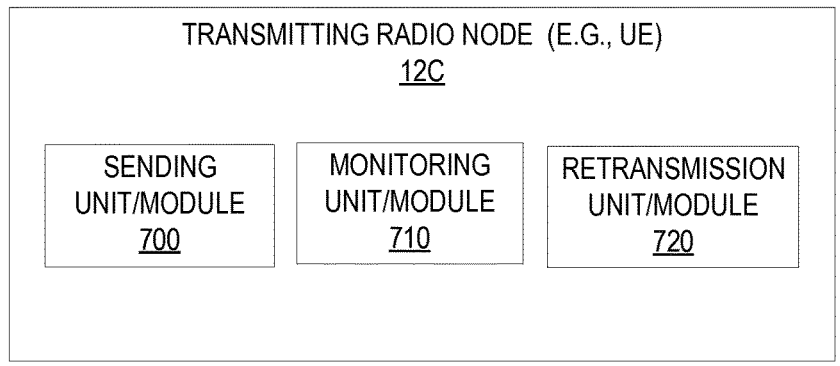
FIG. 12 is a block diagram of a transmitting radio node according to yet other embodiments.

FIG. 12 illustrates the transmitting radio node 12 in the form of a transmitting radio node 12C implemented in accordance with one or more other embodiments. As shown, the transmitting radio node 12C implements various functional means, units, or modules, e.g., via the processing circuitry 500 in FIG. 10 and/or via software code. These functional means, units, or modules, e.g., for implementing the method in FIG. 8, include for instance a sending module 700 for sending a packet 14 from a higher layer 46 to a lower layer 48 of a protocol stack for transmission of the packet 14 from the transmitting radio node 12C to a receiving radio node 16, as scheduled by the receiving radio node 16. Also included is a monitoring module 710 for monitoring an automatic repeat request process at the lower layer 48. Further included is a retransmission module 720 for performing unsolicited retransmission of the packet 14 to the receiving radio node 16 based on said monitoring.

Also note that a receiving radio node 16 (e.g., base station or a wireless communication device such as a UE) as described above may perform the method 100 or 400 and any other processing herein by implementing any functional means or units. In one embodiment, for example, the receiving radio node 16 comprises respective circuits or circuitry configured to perform the steps shown in FIG. 6 or FIG. 9. The circuits or circuitry in this regard may comprise circuits dedicated to performing certain functional processing and/or one or more microprocessors in conjunction with memory. In embodiments that employ memory, which may comprise one or several types of memory such as read-only memory (ROM), random-access memory, cache memory, flash memory devices, optical storage devices, etc., the memory stores program code that, when executed by the one or more processors, carries out the techniques described herein.

Figure 13:
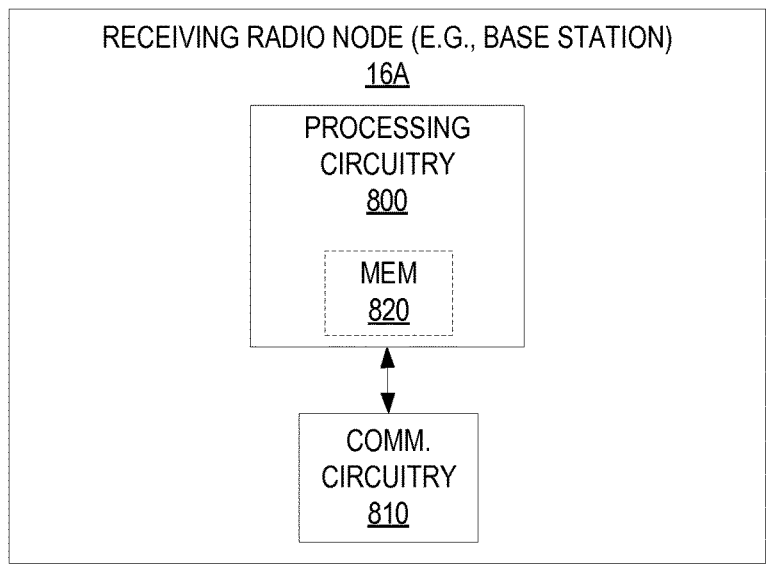
FIG. 13 is a block diagram of a receiving radio node according to some embodiments.

FIG. 13 illustrates the receiving radio node 16 in the form of a receiving radio node 16A in accordance with one or more embodiments. As shown, the receiving radio node 16A includes processing circuitry 800 and communication circuitry 810. The communication circuitry 810 is configured to transmit and/or receive information to and/or from one or more other nodes, e.g., via any communication technology. Such communication may occur via one or more antennas that are either internal or external to the receiving radio node 16A. The processing circuitry 800 is configured to perform processing described above, e.g., in FIG. 6 or FIG. 9, such as by executing instructions stored in memory 820. The processing circuitry 800 in this regard may implement certain functional means, units, or modules.

Figure 14:
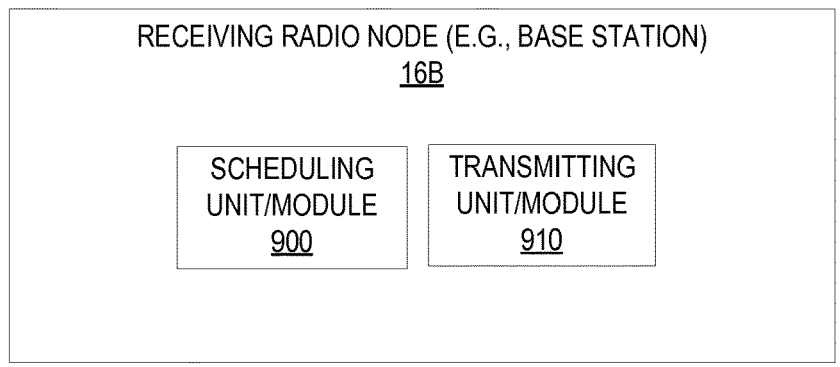
FIG. 14 is a block diagram of a receiving radio node according to other embodiments.

FIG. 14 illustrates the receiving radio node 16 in the form of a receiving radio node 16B implemented in accordance with one or more other embodiments. As shown, the receiving radio node 16B implements various functional means, units, or modules, e.g., via the processing circuitry 800 in FIG. 13 and/or via software code. These functional means, units, or modules, e.g., for implementing the method in FIG. 6, include for instance a scheduling module 900 for scheduling packets to be transmitted from a transmitting radio node 12 over one or more of multiple different types of radio links 18, 20 between which transmission of the packets is configured to be split or switched. Also included is a transmitting module 910 for transmitting to the transmitting radio node 12 a retransmission link indication 40 that indicates over which of the multiple different types of radio links packet retransmission is to be performed.

Figure 15:
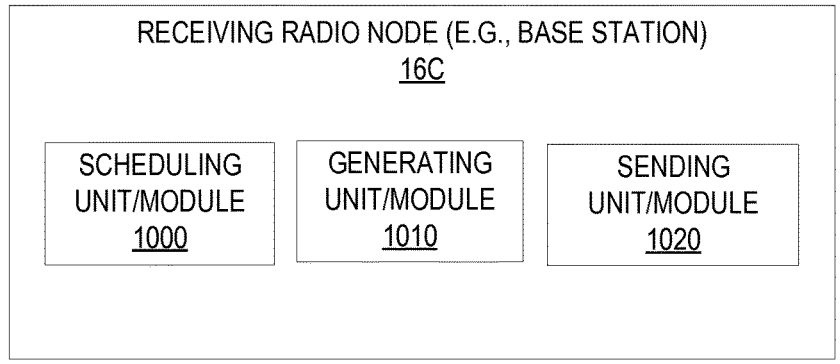
FIG. 15 is a block diagram of a receiving radio node according to still other embodiments.

FIG. 15 illustrates the receiving radio node 16 in the form of a receiving radio node 16C implemented in accordance with one or more other embodiments. As shown, the receiving radio node 16C implements various functional means, units, or modules, e.g., via the processing circuitry 800 in FIG. 13 and/or via software code. These functional means, units, or modules, e.g., for implementing the method in FIG. 9, include for instance a scheduling module 1000 for scheduling transmission of a packet 14 from a transmitting radio node 12 to the receiving radio node 16C. Further included is a generating module 1010 for generating signaling indicating a defined time interval that the transmitting radio node 12 is to wait for the packet 14 to be acknowledged at a lower layer 48 of a protocol stack at the transmitting radio node 12, before the transmitting radio node 12 is to perform unsolicited retransmission of the packet 14 to the receiving radio node 16C. Also included is a sending module 1020 for sending the generated signaling to the transmitting radio node 12.

Those skilled in the art will also appreciate that embodiments herein further include corresponding computer programs.

A computer program comprises instructions which, when executed on at least one processor of a node, cause the node to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of a node, cause the node to perform as described above.

Embodiments further include a computer program product comprising program code portions for performing the steps of any of the embodiments herein when the computer program product is executed by a computing device. This computer program product may be stored on a computer readable recording medium.

Although various embodiments are described where splitting or switching occurs at the PDCP layer, embodiments herein are extendable to other layers as well. In some embodiments, for example, splitting or switching occurs at any layer that has packet reordering processing and is split or switched into lower layer links. Moreover, although various embodiments herein illustrate the different types of radio links 18, 20 as LTE and WLAN, embodiments herein are extendable to any other radio link types as well.

Notwithstanding, one or more embodiments below illustrate examples in a context where splitting or switching occurs at the PDCP layer, and the radio links are LTE and WLAN. In this regard, it has been proposed for Rel-14 to enhance LWA with allowing uplink transmissions in WLAN, either such that uplink (UL) is switched to WLAN or that UL is split between LTE and WLAN. Challenges exist regarding how the UE can be configured and handle uplink transmissions in LWA.

In LTE the uplink access is eNB controlled, i.e. scheduled. In this case, the UE would report to the eNB when data is available for transmissions, e.g. by sending a scheduling request message (SR). Based on this, the eNB would grant the UE transmission of a certain size of data. Further, as there is an RLC layer and more specifically as RLC acknowledged mode (AM) mode is possible, the LTE link may be seen as a lossless link due to the automatic repeat request (ARQ) protocol at the RLC layer. For continuous LTE only operation, there is no need to have PDCP retransmission. PDCP retransmissions are only done at specific occasions, such as handovers and split bearer to non-split bearer transitions in dual carrier. Essentially, PDCP retransmissions are only needed in cases where the RLC entity is released, which involves data loss on the RLC layer.

On WLAN, there is only the MAC hybrid ARQ (HARQ) protocol for handling retransmissions. But MAC HARQ may stop retransmissions after a number of failed attempts. Thus, on the WLAN side, PDCP PDUs may be lost also during the normal operation in both UL and DL. In Rel-13, where only DL traffic could be steered to WLAN, flow control reports sent from UE to eNB could be used for PDCP retransmissions.

Two different formats on flow control reports from UE to eNB were specified in Rel-13. According to the first format, a legacy PDCP report contains a field for first missing sequence (FSM) number which is set to the first missing PDCP SDU. The legacy PDCP report also contains a bitmap field of length in bits equal to the number of PDCP SNs from and not including the first missing PDCP SDU up to and including the last out-of-sequence PDCP SDUs, rounded up to the next multiple of 8. According to the first format, an LWA status report contains: FMS (First Missing PDCP sequence number (SN)), HRW (Highest Received PDCP SN on WLAN), and NMP (Number of Missing PDUs).

There are the following issues for using these messages for UL. The use case for these UL messages would be mainly to avoid hyperframe number (HFN) desync which can be achieved by FMS and PDCP retransmission, and which can to some extent be achieved by the bitmap. The LWA status report can mainly be used for rate estimation which is not that important as the UE anyway cannot control data rate on LTE side as those schedulings are done by the eNB. The information that is missing is the UL path on which these retransmissions should be performed. Further, it should be the eNB's decision as to which PDCP PDUs it requests the UE to retransmit; there may be more efficient formats for such an indication. Third, if those reports are regardless made UE autonomous, one should be able to somehow control that the UE does not retransmit PDCP PDUs that the eNB cannot anymore reorder (SNs that do not anymore belong to the current reordering buffer).

One or more embodiments herein provide methods for UL PDCP retransmission for Rel-14 eLWA, where UL is steered on WLAN or is operating in split mode between LTE and WLAN UL. By providing an efficient means for PDCP retransmissions in the uplink to avoid data loss when using WLAN resources in eLWA, data loss is hidden from higher layers and corrected, which improves the end user performance and/or experience.

In some embodiments referred to as Embodiments A, the eNB requests PDCP retransmissions and includes in the request one or several of the following information: (i) an indication which PDCP PDUs should be retransmitted by the UE; and/or (ii) an indication where (LTE or WLAN) the retransmission should take place.

In one or more of these embodiments, based on eNB request and information, the UE retransmits the PDCP SNs indicated as not yet acknowledged, i.e. for retransmission. The request for retransmission can also be interpreted by the UE as a recommendation, although it is more likely that UE needs to retransmit what is requested. The UE uses the indicated UL direction by the eNB.

The eNB may convey this information to the UE by PDCP Control PDU, for example an extended version of the PDCP status report or the PDCP LWA status report or a variant of those.

In one version, the request is optionally FMS, and one of the following (or a variant): (i) bitmap for the PDCP PDU SNs to be retransmitted; (ii) list of PDCP SNs to be retransmitted; (iii) optionally start and optionally end PDCP SNs to be retransmitted; (iv) HRW (Highest Received PDCP SN on WLAN) and/or NMP (Number of Missing PDUs).

And the indication of the UL direction may be conveyed in the PDCP level request or the UL direction for retransmission may be RRC configured.

To indicate the uplink direction within a PDCP Control PDU, a flag may be used in some embodiments. If the flag is set, LTE should be used for the retransmissions. If the flag is not set, WLAN should be used. In another variant, setting the flag indicates that the not-RRC-configured uplink direction is used (i.e. not the one for continuous UL operation). An extended LWA status report or PDCP status report may be used as basis for extending the PDCP control PDU.

In yet another variant, instead of the flag indicating the uplink direction for retransmissions, setting the flag means that the uplink direction from now on, i.e. for both retransmission and continuous operation, changes to another uplink direction, i.e. the uplink direction is toggled.

Alternatively the eNB may convey this information to the UE in form of an RRC command. It may be indicated in the RRC-connection-reconfiguration, e.g. which uplink direction PDCP retransmissions could take, which can be separate to the configuration of which direction continuous uplink directions would take. In this example, it can also be preconfigured by RRC or standardized, that uplink retransmissions should take another direction (LTE or WLAN) than continuous uplink transmissions. I.e. on top of this preconfiguration, the eNB could issue, or the UE could trigger the retransmissions dynamically, e.g. based on PDCP control.

In other embodiments referred to as Embodiments B, in case the UE keeps track of not successfully sent PDCP PDUs by monitoring WLAN HARQ retransmissions, a timer is used to control how old packets must be before being retransmitted. An indication may govern where (LTE or WLAN) the retransmission should take place, similar to the eNB request case in embodiments A.

In embodiments B, the UE may also do retransmissions on its own without eNB request. Some embodiments in this regard add ARQ functionality to the Rel-13 LWAAP layer that does retransmissions similar to LTE RLC layer. The ARQ on the LWAAP sublayer in the UE may be triggered by the lack of a WLAN MAC layer ACK. Such retransmissions may be timer based such that the UE retransmits PDCP PDUs that are not ACKed by WLAN MAC layer within a timer configured by eNB. The timer in some embodiments starts when the PDCP layer sends a PDCP PDU to the WLAN MAC layer. One benefit of the timer is that the retransmitted PDCP PDUs are more probably still useful at the eNB. Such a timer indication may for example be configured in the UE by the eNB through the RRC reconfiguration procedure when establishing/configuring LWA. In this embodiment, the UL path may be indicated separately using similar means as with the eNB request cases.

In yet another embodiment, a mixture of the above embodiments A and B may be applied. As one example, the eNB may periodically send FMS to UE in order for the UE to keep SFN sync. The eNB may send PDCP retransmission requests and the UL direction is set according to an option in "indication of UL path". As another example, the eNB periodically sends FMS to UE in order for the UE to keep SFN sync. UE does retransmissions based on own its bookkeeping of not successfully transmitted PDCP PDUs. The eNB may send PDCP retransmission requests and the UL direction is set according to an option in "indication of UL path".

Other combinations are possible as well. Note in this regard that embodiments A and B may be combined such that even if B is true. the eNB may send retransmission requests.

One or more embodiments are described within the context of the integration of LTE and WLAN. It should be understood that the problems and solutions described herein are equally applicable to wireless access networks and user equipments (UEs) implementing other access technologies and standards. LTE and WLAN are used as example technologies where some embodiments are suitable, and using LTE and WLAN in the description therefore is particularly useful for understanding the problem and solutions solving the problem.

The invention claimed is:

1. A method implemented by a transmitting radio node for transmitting packets in a wireless communication system, the method comprising:
   transmitting packets to a receiving radio node as scheduled by the receiving radio node over one or more of multiple different types of radio links between which transmission of the packets is configured to be split or switched;
   receiving, from the receiving radio node, a request message requesting retransmission of a particular packet, the request message including a retransmission packet indication that indicates the particular packet to retransmit to the receiving radio node and a packet-specific retransmission link indication that indicates over which of the multiple different types of radio links the particular packet is to be retransmitted; and
   performing packet retransmission based on the retransmission link indication.

2. The method of claim 1, wherein the retransmission packet indication comprises a first missing packet sequence number.

3. The method of claim 1, wherein the retransmission link indication comprises a flag in a control message.

4. The method of claim 3:
   wherein the flag being set indicates that packet retransmission is to be performed over a particular one of the radio links; and
   wherein the flag not being set indicates that packet retransmission is to be performed over a different one of the radio links.

5. The method of claim 1, wherein the retransmission link indication indicates that packet retransmission is to be performed over a different radio link than the radio link over which original packet transmission is configured to be performed.

6. The method of claim 1, wherein the retransmission link indication is a transmission link indication indicating generally over which of the multiple different types of radio links packet transmission and retransmission is to be performed.

7. The method of claim 1, wherein the different types of radio links use different radio access technologies.

8. A method implemented by a receiving radio node for receiving packets in a wireless communication system, the method comprising:
   scheduling packets to be transmitted from a transmitting radio node over one or more of multiple different types of radio links between which transmission of the packets is configured to be split or switched; and
   transmitting, to the transmitting radio node, a request message requesting retransmission of a particular packet, the request message including a packet-specific retransmission packet indication that indicates the particular packet to retransmit to the receiving radio node and a retransmission link indication that indicates over which of the multiple different types of radio links the particular packet is to be retransmitted.

9. The method of claim 8, wherein the retransmission packet indication comprises a first missing packet sequence number.

10. The method of claim 8, wherein the retransmission link indication comprises a flag in a control message.

11. The method of claim 10:
    wherein the flag being set indicates that packet retransmission is to be performed over a particular one of the radio links; and
    wherein the flag not being set indicates that packet retransmission is to be performed over a different one of the radio links.

12. The method of claim 8, wherein the retransmission link indication indicates that packet retransmission is to be performed over a different radio link than the radio link over which original packet transmission is configured to be performed.

13. The method of claim 8, wherein the retransmission link indication is a transmission link indication indicating generally over which of the multiple different types of radio links packet transmission and retransmission is to be performed.

14. The method of claim 8, wherein the different types of radio links use different radio access technologies.

15. A transmitting radio node for transmitting packets in a wireless communication system, the transmitting radio node comprising:
    processing circuitry; and memory containing instructions executable by the processing circuitry whereby the transmitting radio node is configured to:

transmit packets to a receiving radio node as scheduled by the receiving radio node over one or more of multiple different types of radio links between which transmission of the packets is configured to be split or switched;

receive from the receiving radio node a request message requesting retransmission of a particular packet, the request message including a packet-specific retransmission packet indication that indicates the particular packet to retransmit to the receiving radio node and a retransmission link indication that indicates over which of the multiple different types of radio links the particular packet is to be retransmitted; and perform packet retransmission based on the retransmission link indication.

16. A receiving radio node for receiving packets in a wireless communication system, the receiving radio node comprising:

processing circuitry; and memory containing instructions executable by the processing circuitry whereby the receiving radio node is configured to:

schedule packets to be transmitted from a transmitting radio node over one or more of multiple different types of radio links between which transmission of the packets is configured to be split or switched; and transmit to the transmitting radio node a request message requesting retransmission of a particular packet, the request message including a packet-specific retransmission packet indication that indicates the particular packet to retransmit to the receiving radio node and a retransmission link indication that indicates over which of the multiple different types of radio links the particular packet is to be retransmitted.

\* \* \* \* \*